United States Patent
Nussbaumer

(10) Patent No.: US 6,672,342 B2
(45) Date of Patent: Jan. 6, 2004

(54) APPARATUS FOR CONTROLLING THE DISCHARGE OF FLOWABLE MATERIAL

(75) Inventor: Arthur Nussbaumer, Düdingen (CH)

(73) Assignee: AT Anlagetechnik AG, Dudingen (CH)

( * ) Notice: Subject to any disclaimer, the term of this patent is extended or adjusted under 35 U.S.C. 154(b) by 0 days.

(21) Appl. No.: 10/101,770

(22) Filed: Mar. 21, 2002

(65) Prior Publication Data

US 2002/0134796 A1 Sep. 26, 2002

(30) Foreign Application Priority Data

Mar. 22, 2001 (EP) .......................................... 01 107 137

(51) Int. Cl.[7] .................................................. B65B 3/26
(52) U.S. Cl. .......................... 141/83; 141/94; 141/348; 141/368; 222/185.1; 222/509
(58) Field of Search ............................. 222/185.1, 504, 222/509, 559, 196, 200; 141/83, 94, 312, 346, 348, 349, 368, 387; 251/60

(56) References Cited

U.S. PATENT DOCUMENTS

| | | | | |
|---|---|---|---|---|
| 3,072,295 A | * | 1/1963 | Lovette | 222/504 |
| 3,788,368 A | * | 1/1974 | Geng et al. | 141/67 |
| 4,662,409 A | * | 5/1987 | Egli | 141/1 |
| 4,691,843 A | | 9/1987 | Dunan | |
| 4,696,329 A | * | 9/1987 | Izzi | 141/1 |
| 5,019,250 A | * | 5/1991 | Lorenzen | 210/85 |
| 5,738,153 A | * | 4/1998 | Gerling et al. | 141/83 |
| 5,957,331 A | | 9/1999 | Minor et al. | |
| 6,296,152 B1 | * | 10/2001 | Semenenko | 222/199 |

FOREIGN PATENT DOCUMENTS

| | | |
|---|---|---|
| DE | 2923 444 | 12/1980 |
| EP | 0 272 610 | 12/1987 |
| EP | 0 644 136 | 9/1993 |
| WO | WO90/08724 | 8/1990 |

\* cited by examiner

*Primary Examiner*—Timothy L. Maust
(74) *Attorney, Agent, or Firm*—Burns, Doane, Swecker and Mathis, LLP

(57) ABSTRACT

An apparatus for controlling the discharge of flowable material from a first compartment having a discharge opening near a lower end thereof comprises a closure member which is movable by an actuator and an adjusting device between a closed position in which the discharge opening is shut and a raised open position in which a gap of a certain width to said discharge opening is opened to allow the flowable material to flow through the gap and the discharge opening. Adjoining the discharge opening is a conveyor section for providing a predetermined path of conveying the material into a second compartment. The quantity of material flown to the second compartment is determined by a quantity determining means. A control unit controls at least the adjusting device and the width of the gap to achieve a desired degree of delivery to the second compartment.

14 Claims, 2 Drawing Sheets

APPARATUS FOR CONTROLLING THE DISCHARGE OF FLOWABLE MATERIAL

FIELD OF THE INVENTION

This application claims priority under 35 U.S.C. §§119 and/or 365 to 01107137.0 filed in Europe on Mar. 22, 2001; the entire content of which is hereby incorporated by reference.

This invention relates to an apparatus for controlling the discharge of flowable material from a first compartment that has a discharge opening near a lower end thereof. A closure member is movable between a closed position in which it shuts this discharge opening and a raised open position in which it opens an annular gap of a certain width around the discharge opening to allow said flowable material to flow through said gap and said discharge opening. There are conveying walls adjoining the discharge opening for providing a predetermined path of conveying the flowable material, when flowing through the discharge opening, into a second compartment in communication with the conveying path. An actuating device moves the closure member from its closed position into its open position and vice-versa. Furthermore, there is an adjusting device for adjusting the width of the above-mentioned annular gap. Support means in the path of the conveying walls hold both the actuating and the adjusting devices.

Such an apparatus is disclosed in U.S. Pat. No. 6,123,233 which is hereby incorporated in its entirety. In an apparatus of this type, the flowable material is of a certain sensitive or hazardous nature and may consist of powdery vitamins or also dangerous dust, e.g. chemicals or even radioactive substances. The term of "compartment" should be considered in its broadest sense and may encompass conveying vessels, bins, conveying conduits, mixers, reactors or process and reaction zones (e.g. in a chemical process). The terms "filling" and "concentration", as used below, should be understood in their broadest meaning.

Although U.S. Pat. No. 6,123,233 describes a specific and especially advantageous actuating device, the present invention is not restricted to it, but could also use bellows, cylinders or other actuators.

BACKGROUND OF THE INVENTION

From E-A-29 23 444, WO 90/08724 and U.S. Pat. No. 4,691,843, which are incorporated in their entirety, it is known to vary the gap of the closure member by varying its open top position. However, all these known designs are constructed in such a way that, in order to vary this gap, a fitter had to have access into the interior of the bin or vessel. This is, of course, not possible while the material flows out. Thus, the operation of the bin or vessel had to be interrupted, and the latter had to be dismantled so that the fitter could reach the interior. It is clear, that it could even be dangerous for a filter because of possible contact with hazardous substances. When the fitter is in the interior, he cannot check the effect of his adjustment onto the flow properties of the material and, therefore, adjustment can only be effected very roughly and arbitrarily. One could only determine whether the adjustment was correct or insufficient during operation. In addition, bulk material in a vessel may assume a different consistency over time. The result may be that the adjustment and position chosen is first suitable, but later the flow properties change over time. However, varying the position of the closure member during operation is not possible with the known designs.

From DE-A-29 23 444, WO 90/08724 and U.S. Pat. No. 4,691,843, it is known to vary the gap of the closure member by varying its open top position. However, all these known designs are constructed in such a way that, in order to vary this gap, a fitter had to have access into the interior of the bin or vessel. This is, of course, not possible while the material flows out. Thus, the operation of the bin or vessel had to be interrupted, and the latter had to be dismantled so that the fitter could reach the interior. It is clear, that it could even be dangerous for the man to contact there the hazardous substances. When the fitter is in the interior, he cannot check the effect of his adjustment onto the flow properties of the material and, therefore, adjustment can only be effected very roughly and arbitrarily, and one can only determine whether the adjustment was correct or insufficient during operation. In addition, bulk material in a vessel may assume a different consistency over time. The result may be that the adjustment and position chosen is first suitable, but leads to varying flow properties over time in one or the other sense. However, varying the position of the closure member during operation is not possible with the known designs.

SUMMARY OF THE INVENTION

Therefore, it is an object of the present invention to enable or, at least, facilitate precise fine metering without the necessity of interrupting the operation.

This object is achieved by providing a quantity determining device for determining the amount of flowable material flown to the second compartment, and a control arrangement for controlling at least the adjusting means and the width of said gap to achieve a desired degree of delivery to the second compartment. Although it is preferred to have the control effected automatically by connecting the quantity determining device to the control arrangement, this is not necessary under all circumstances; for example, it could be sufficient that the quantity determining device merely indicates the amount of flowable material flown to the second compartment or degree of delivery by measuring a related value so that an operator can accordingly handle the control arrangement. The amount of flowable material flown to the second compartment can be determined either more or less directly by weighing or measuring volume of the material, or indirectly by determining the concentration of the material in a process zone, by measuring the pH, a temperature change caused by the material or by using a Geiger detector or the like.

The use of an actuator of variable gap is, in principle, known from the above-mentioned DE-A-29 23 444, WO 90/08724 and U.S. Pat. No. 4,691,843. To add an adjustment device to an invariable actuator is known per se by U.S. Pat. No. 6,123,233. However, to combine them with a control which is able of controlling the adjustment device during operation, i.e. during filling, in such a manner that the flow of flowable material can be controlled by selecting the width of the discharge gap is the "missing link" which enables precise dosing and metering.

In principle, it would be conceivable to have the control arrangement acting onto both the actuator and the adjustment device, for example in the sense of a cascade control wherein the adjustment device is controlled into an extreme position and the actuator is used for setting the desired gap width (or vice-versa, the actuator moves into a predetermined position, while the adjustment device adjusts the gap width which is preferred).

Particularly in the case of a vertical arrangement, e.g. as according to U.S. Pat. No. 6,123,233, the construction according to the invention also be used for loosening the bulk material in the first compartment by raising and lowering the actuator relative quickly, thus achieving the effect of a vibrator, i.e. promoting flow of the material. In this way, a separate vibrator can be omitted. This can be done automatically, if desired, if the control arrangement is formed to control also the loosening device. Such loosening device can also be formed, as is known per se, be air nozzles in the region of the top of the closure member, i.e. on it or around it.

In any case, the quantity determining device for determining the actual degree of filling and (or) concentration, e.g. in a second vessel docked to the conveying path of the first vessel, in the case of a manual operation, it is possible to read the indication of the degree and to close the closure member, when a desired degree has been reached.

However, it is also possible to chose a wider discharge gap if it turns out that the gap width normally used leads to too long a filling time. To this end, it is useful if the quantity determining device comprises a timer for determining the degree per time unit.

All these functions cane be automated, if the control arrangement comprises a comparator stage for comparing the degree preset by a presetting device with a value related to the actual degree determined by the quantity determining device.

BRIEF DESCRIPTION OF THE DRAWINGS

The above objects and features of the present invention will be more apparent from the following description of the preferred embodiments with reference to the accompanying drawings, wherein.

DETAILED DESCRIPTION OF THE DRAWINGS

Figure 1:
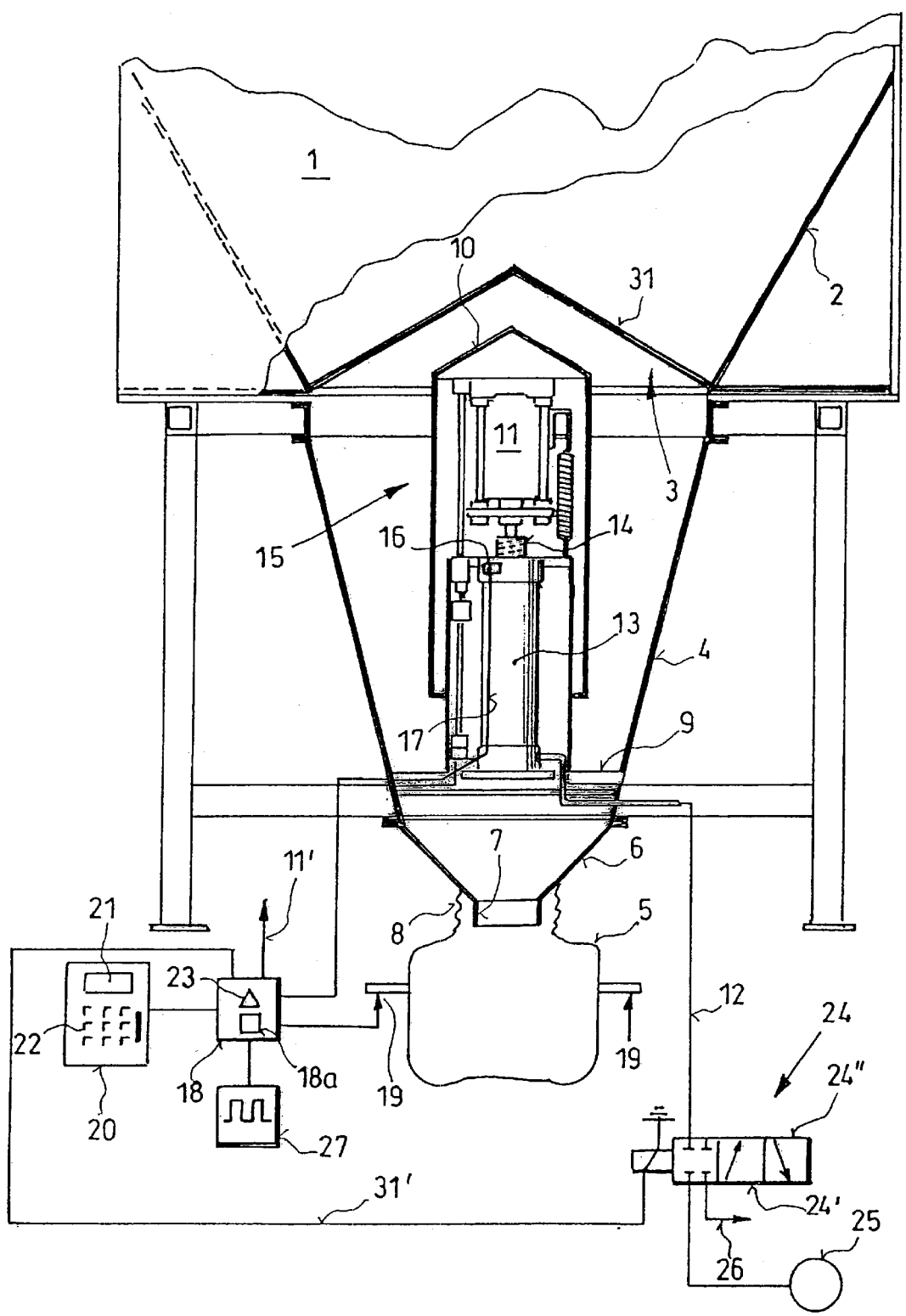
FIG. 1 shows an embodiment comprising a variable actuator as is known by the prior art, but which has a balance for determining the filling degree and a control arrangement, which embodiment is supplemented, according to the invention and FIG. 2 by an adjustment device in conjunction with the actuator, the amount of material flown to a second compartment being determined volumetrically.

According to FIG. 1, bulk material (or even liquid material) should be transferred from a bin 1 or any other compartment through a discharge hopper 2 and a discharge opening 3 at the lower end of the bin 1 and into a funnel-shaped conveying section 4 and a container 5 docked to it. The size ratio of bin 1 and container 5 are only roughly represented, i.e. the bin or discharge vessel 1, which is shown to be relative large could be smaller in relation to the container 5, and the latter may be larger than illustrated in FIG. 1. Although the invention will subsequently be described with reference to a purely vertical flow of material, it is also known that such bins 1 may have their discharge end turned to the side. Furthermore, the docking devices are not shown and may assume any shape known per se, since it is not of any significance for the present invention. In FIG. 1, the conveying section 4 and its conveying path comprises a discharge funnel 6 having an adjoining cylindrical portion 7 onto which the inlet opening of the container 5 is slid on and is sealed, for example, by a bellows 8. Docking devices and corresponding sealings have been suggested in various forms so that those skilled in the art may chose from a wide field of possibilities. As mentioned above, the container 5 is a mere example of a variety of possible second compartments, for example different reaction zones of a single reactor or also of a mixer to be filled through a corresponding connection.

The discharge opening 3 may be closed, as known per se, by a cone 31. This does not mean that the present invention is restricted to this type of closure members, although this type (or a frusto-conical one) is preferred. However, it would also be possible to use a slide or rotary valve having either a horizontal or vertical axis of rotation, as has also been suggested for closing bins or other large containers.

Within the conveying section 4, an actuating device 15 for the closure cone 31 is fastened and held by radial stretchers 9. Alternatively, the actuating device 15 could be held from inside the bin, as is also known per se, but not preferred. The actuating device 15 comprises an actuator cone 10 which, in raised position, engages the closure cone 31 from below and then raises the cone 31 so that an annular gap is formed around the edge of the closure cone 31 and is defined exteriorly by the discharge hopper 2, when the actuator cone 10 is completely raised to its maximum height. Bulk material will then flow through this annular gap, through the conveying section 4 and into the discharge funnel 6 and finally into the container 5.

In order to promote this flow and transfer of material, a vibrator 11, forming part of the actuating device 15, is often (but not always) provided below the actuator cone 10 and is, for example, pneumatically actuable. The supply of actuating air can be effected either through a pneumatic conduit 12 shown or via a separate conduit.

For this conduit 12 leads, as represented, to an actuation cylinder 13 whose piston rod 14 is connected to the actuator cone 10 and/or the vibrator 11 at top. The details of this connection are of known nature and should, therefore, not be discussed in detail. However, it should be noted that the piston rod 14 may cooperate with a magnetic (or other) sensor 16 which is attached to the cylinder 13. As is indicated in dotted lines, the piston rod 14 is provided with a thread below a tube that is slid over. This thread constitutes a magnetic discontinuity in accordance with U.S. Pat. No. 3,956,973. When the piston rod 14, starting from its initial position corresponding to the closed position of the cone 31, is displaced in upward direction, each of these discontinuities causes a pulse from the sensor 16 to be delivered to a line 17 so that the position of the piston rod can be determined at any time by counting the pulses. Since finally the cone 31 is raised via the piston rod 14, the position of the cone 31 may be determined in this way and, thus, the width of the annular gap between the cone 31 and the discharge hopper 2.

Counting the pulses, i.e. determining the position of the cone 31 and the width of the annular gap between the peripheral edge of the cone 31 and the discharge hopper 2, is effected by means of a control unit or processor 18, preferably a micro-processor, which receives, at the same time, an information relating to the degree of delivery from the container 5, here in terms of weight. To this end, the container 5 is formed, according to the present embodiment of FIG. 1, as a weighing container, i.e. it is supported by load cells 19 schematically indicated or is provided with similar sensors for determining the weight. These sensors 19 will supply an information about the actual filling degree of the container 5 to the processor 18. In the case of measuring a concentration for a degree of delivery, a wide variety of sensors for determining the concentration could be used, such as viscometers, pH probes, nephelometers, spectrometers, gas meters (e.g. for measuring the concentration of gas derived from a substance delivered from bin 1), such as $CO_2$ meters, oxygen meters and so on. In the case a mixer is used as a second compartment, it would be possible, for example, to determine the concentration of bulk material in a blend by measuring the current consumption of the mixer motor. Alternatively, when electrically conductive material has to blended, such as graphite dust or metal dust, the conductivity of the blend could be measured.

In this way, the container 5 could be formed and used as a premix container which picks up a desired quantity of each one of individual components from different bins 1 to comply with a given formulation. The balance 19 determines the weight of the container 5 at arrival at a certain bin after which the necessary amount of flowable material from the next bin or vessel to which the container 5 is docked is added. Of course, it would be possible to do without the information relating to the actual position of the cone 31, that is supplied via the line 17, because it may be sufficient to know from the signals of the sensors 19 that the container 5 has not yet received the necessary quantity of flowable material.

It should be noted that in some applications, as an alternative or cumulatively, the loss of weight of the bin 1 (or other first compartment) could be determined, e.g. instead of determining the increase in weight of the container 5 (or a second compartment).

In order to automate the operation, it is preferred to connect an operating panel 20,to the processor 18 which displays the filling quantity within the container 5 by a display 21, on the one hand, and is preferably provided with an input key board 22 in order to preset the desired (nominal) quantity of flowable material or the desired filling degree of the container 5. The processor 18 may have a comparator stage 23 for comparing a value representative for the actual filling degree in the container 5 with a preset desired filling degree. However, it would also be possible to compare the actual filling degree with the position of the cone 31, i.e. if the filling degree is unsatisfactory and the actual position of the cone 31 permits further opening, the annular gap between the peripheral edge of the cone 31 and the discharge hopper 2 could be widened. Moreover, the processor 18 could comprise a further output line 11' leading to a vibrator 11 in order to promote the flow of material from the bin 1 by vibrating it.

The adjustment of the height of the cone 31 is effected through a signal line 31' which actuates a valve 24. In the closed position of the cone 31, as shown, the path from a source of pressurized air 25 to the pneumatic conduit 12 is interrupted. In a position 24' of the valve 24, the source of pressurized air 25 communicates with the pneumatic conduit 12 and supplies air under pressure to the cylinder 13 until the sensor 16 indicates that a certain position given by the control unit 18 has been reached. Then, the valve 24 is closed again and blocks, thus, also draining from the conduit 12, i.e. the respective position of the piston rod 14 is fixed.

If one wants to lower the cone 31 again, the valve 24 is switched into the position 24" in which the pneumatic conduit 12 communicates with an air evacuation duct 26. It is clear that the output line 11' of the processor 18 is switched in a similar manner and that either the line 11' can be provided for controlling the vibrator 11, which forms part of the actuating device 15, or a line 31' or both. Furthermore, it is to be understood that a vibrator may be also arranged on the housing of the bin 1 or at any other place, instead of the vibrator 11 centrally arranged along the longitudinal axis of the actuating device 15. Alternatively, air is blown through nozzles into the bulk material for loosening it, as is well known in the prior art. Actuating these air nozzles can also be controlled by the processor, either as an alternative or in combination with the other features. In this sense, the term of "actuating device" has to be understood in the broadest sense as any actuating device which enables or facilitates flowing of the material from the first compartment 1.

Providing at least two output lines 11' and 31' of the processor 18 enables programming for cascade or sequential control. To this end, the cone 31 is displaced, for example, in one of its (variable) open positions. If the increase of the filling degree of the container 5 is insufficient, the vibrator 11 may be activated in a first step via the line 11'. If this does not lead to a satisfying result, the program could be formed in such a manner that the cone 31 is raised further. This may be repeated until the flow of material or the filling degree in the container is satisfying. Of course, the program could also be modified by first opening the cone 31 further, if the flow of material is insufficient, and activating the vibrator (or any other loosening device) only then if necessary. Nevertheless, loosening the flowable material can also be done according to the invention without any vibrator 11, for example by using the control unit 18 to impress a vibration movement to the cone 31 via the cylinder 13. It will be understood that the program of such a sequence has to be contained in a program memory that, for example, is incorporated as a memory 18a within the processor 18. However, it is preferred to have the program memory releasable connected to the processor 18 in order to be able to change the program, if desired, and to adapt it to different requirements. For example, it would be conceivable for relative small quantities to be dosed to keep the actuating device 15 for the cone 31 in the position which corresponds to the closed position of the cone 31, but to lift the cone 31 only slightly via the motor 28 (FIG. 2), in which case it may be suitable to provide either a position sensor (of similar function as that of the sensor 16 of FIG. 1) for the position either of the cone 31 or the spindle 29. To this end, the spindle 29 could be provided with an, e.g. optical, magnetical, capacitive or inductive, angle transmitter, or the motor 28 is formed as a stepping motor whose revolving steps can be counted.

Figure 2:
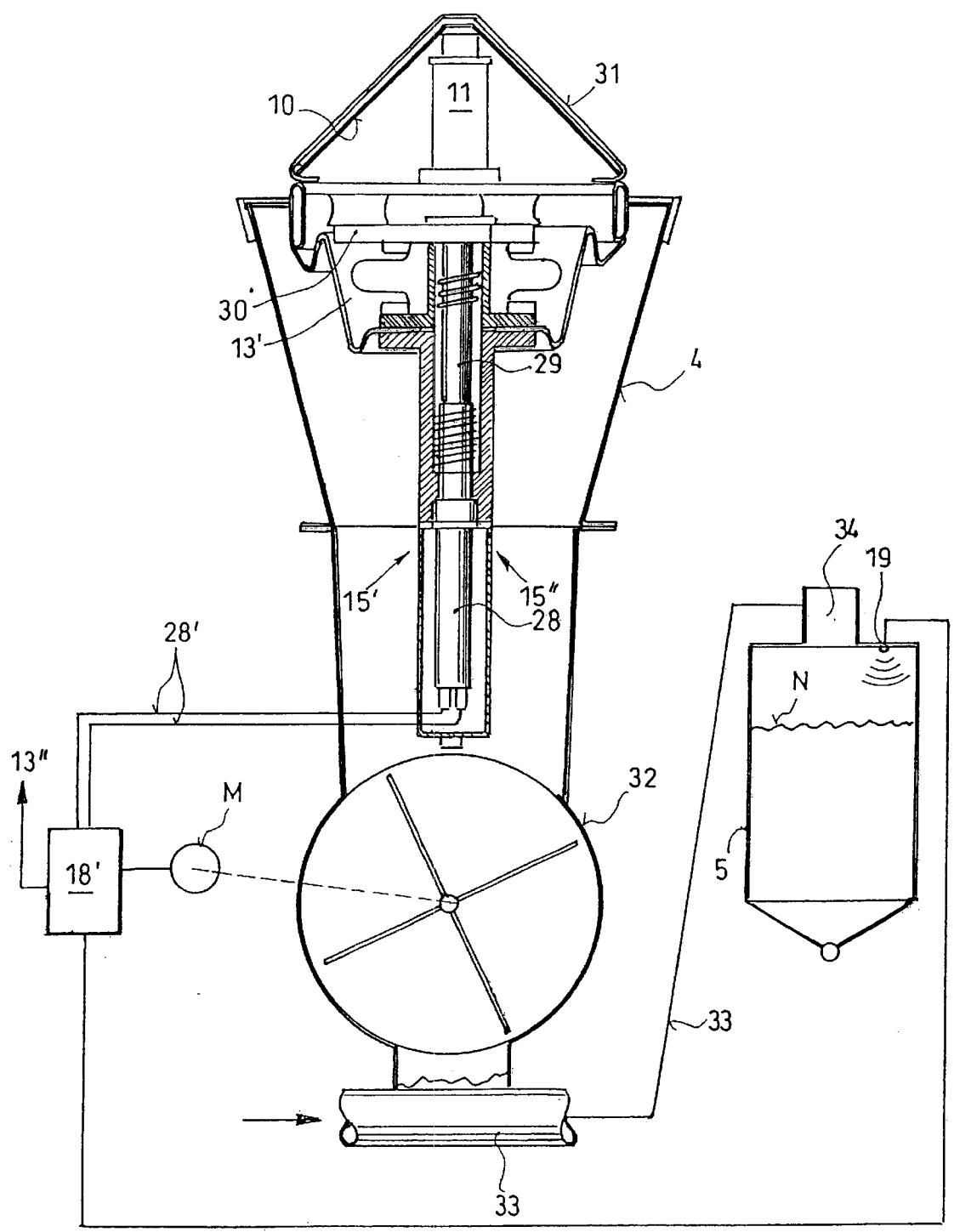

A further possibility is the following: Filling the container 5 should be carried out in a time saving manner. FIG. 2 shows a means how filling can be accelerated. Referring back, however, to FIG. 1, it is clear that a processor, such as processor 18, needs a clock generator 27 for determining the course of a program anyway. This clock generator 27 may serve as a timer for determining the variation of the filling degree of the container 5 per time unit (the first derivation of the filling degree over time, i.e. the control unit 18 has to be able to differentiate). In this way, controlling operation, as described above, could be effected in dependence on the filling rate or the filling degree per time unit. It will be understood that any other control system with a clock generator 27 assigned as a timer could be used instead of a processor 18 provided with the clock generator 27.

Reference has already been made above to FIG. 2. In this embodiment an actuation unit 15' comprises two different devices, one of which, e.g. in the form of a bellows 13', being for roughly actuating the cone 31, while the other one constitutes a fine adjustment device 15" which, for example, is designed in the manner described in U.S. Pat. No. 6,123, 233. This arrangement can be used to reduce the time of filling by first raising the cone 31 by means of the bellows 13' to its maximum height so that the bulk material flows down at a high rate, e.g. into the container 5 according to FIG. 1. When the filling degree in the container 5 reaches a (threshold) value near that nominal value preset by means of the key board 22, a motor 28 (be it an electrical motor or a pneumatical rotating motor) can switched on to displace a threaded spindle 29 in such a way that the discharge gap of the bin 1 (being present in FIG. 2 in the same way as in FIG. 1) is made smaller so that dosing is effected in a highly precise manner.

Also in this case, a sequential control is possible. One could provide that first the cone 31 is lowered by the bellows 31' when the filling degree passes a first threshold value so as to reduce the annular gap between the peripheral edges of the cone 31 and the hopper 2 (FIG. 1). At the same time, the motor 28 could rotate the threaded spindle 29 in such a way that a support plate 30, which engage its thread, together with the actuator cone 10 reaches its relative maximum height. Only when reaching another threshold value, the bellows 13' (or other actuator) is, for example, lowered so that the cone 31 would close the discharge opening 3, if the threaded spindle had not rotated so that a small annular gap remains still open for allowing the bulk material to flow through. Only when the nominal filling degree has been reached, the spindle 29 is rotated in the sense of completely lowering the cone 31 into its closed position.

It is clear that the output line 28' shown in FIG. 2 is purely schematically illustrated; for in the case of a pneumatic motor, it would be suitable to interpose an electrical motor control stage in the line 28'.

FIG. 2 shows also that the invention could likewise be applied to control the filling degree in a volumetric manner. To this end, a rotary valve 32 may communicate with the conveying section 4 and may be driven by a motor M. Of course, the filling degree of the individual cells of the rotary valve 32 will depend on whether a sufficient quantity of bulk material flows out of the discharge opening (3 in FIG. 1). If it is possible to determine the filling degree of the individual cells of the rotary valve 32, a corresponding signal could be supplied to the processor 18'. Since, however, this could be difficult or unprecise under certain circumstances, it is possible to proceed as follows.

In the embodiment of FIG. 2, a pneumatic conveying conduit 33, e.g. operated under flight conveyance conditions, but optionally under conveyance conditions (slow conveyance), is postponed after the rotary valve 32. This conduit 33 leads to a container 5' to be filled which communicates with a separator 34, e.g. in the form of a cyclone. Thus, a certain level N within the container 5' will result after a certain time. This level N can be determined by a level meter or volumeter 19', for example formed by an ultrasonic range detector or by any other known volumetric sensor. The result is supplied to the processor 18' which, in turn, either via an output line 13" controlling the bellows 13', via the line 28' which controls the adjusting device 28, 29 and/or via a line 11' (in FIG. 2 not shown for the sake of simplicity) actuates the loosening device (vibrator 11) in the manner described above.

It is certainly not necessary to provide a rotary valve 32. If, for example, the conveying conduit 33 is formed as a suction conduit, it would be able to suck the flowable material immediately through the annual gap formed around the opened cone 31. Likewise, it is possible to design the bin 1 as a pressure tank which presses the flowable material through the annular gap. Even combinations of both procedures are possible. However, in the case a charging valve is interposed, it must not necessarily be a rotary valve, but can be of any known nature.

It is clear that the rotary valve or its motor M could also be connected to and controlled by the processor 18' in order to give an information about the rotary speed and/or the number of revolutions (which, in turn, gives an information about the volume of material conveyed). It is also conceivable to control the rotary valve 32 by the processor 18' in such a manner that it conveys first at a large rate of volume of flowable material to the container 5' and is then slowed down when the nominal filling degree is approached.

Thus, it may be understood by those skilled in the art that the invention can be realized by a variety of different embodiments which are not restricted to those illustrated in the drawings. Above all, it is possible to combine individual components or functions of the embodiments shown, for example by providing a balance 18 for gravimetrically dosing instead of a volumetrical one also in the case of FIG. 2 and vice-versa. Furthermore, details of the control arrangement of one figure could be applied to the design of the other figure. For example, actuation could be effected by motors, cylinders or bellows, and the closure member could also be modified. Instead of having a loosening device, a vibrator could be used for compacting the material intentionally, because some bulk materials, such as metal dust, can be promoted to flow by slightly compacting it (e.g. by a suitably placed vibrator).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for controlling the discharge of flowable material from a first compartment having a discharge opening near a lower end thereof, comprising:

closure means movable between a closed position in which said discharge opening is shut and a raised open position in which an annular gap of a certain width to said discharge opening is opened to allow said flowable material to flow through said annular gap and said discharge opening, conveying means adjoining said discharge opening for providing a predetermined path of conveying said flowable material, when flowing through said discharge opening, into a second compartment;

actuating means for moving said closure means from said closed position to said open position and vice-versa;

adjusting means for adjusting said width of said annular gap;

support means for holding said actuating means and said adjusting means;

quantity determining means for determining the amount of flowable material flown to said second compartment;

control means for controlling at least said adjusting means and the width of said annular gap to achieve a desired degree of delivery to said second compartment; and preset means for presetting said desired degree of delivery wherein said control means comprise comparison means for comparing the desired degree preset by said presetting means with a value related to an actual degree determined by said quantity determining means and for adjusting the annular gap in response to the comparing at any time during flow of the flowable material.

2. The apparatus according to claim 1, wherein said support means are arranged in the path of said conveying means.

3. The apparatus according to claim 1, wherein said control means are adapted to control said actuating means.

4. The apparatus according to claim 1, further comprising loosening means for loosening said flowable material in said first compartment.

5. The apparatus according to claim 1, wherein said quantity determining means comprise weighing means.

6. The apparatus according to claim 1, wherein said quantity determining means comprise timing means for determining a degree per time unit.

7. The apparatus according to claim 1, wherein said adjusting means are adapted to vary said width continuously.

8. The apparatus according to claim 1, wherein said closure means is conical at least in part.

9. The apparatus according to claim 1, wherein said closure means is vertically movable by said actuating means and said adjusting means.

10. The apparatus according to claim 1, wherein said control means comprise detecting means for determining a position of said closure means.

11. The apparatus according to claim 4, wherein said control means are adapted to control said loosening means.

12. An apparatus for controlling the discharge of flowable material from a first compartment having a discharge opening near a lower end thereof, comprising:

closure means movable between a closed position in which said discharge opening is shut and a raised open position in which an annular gap of a certain width around said discharge opening is opened to allow said flowable material to flow through said annular gap and said discharge opening, conveying means adjoining said discharge opening for providing a predetermined path of conveying said flowable material, when flowing through said discharge opening, into a second compartment;

actuating means for moving said closure means from said closed position to said open position and vice-versa;

adjusting means for adjusting said width of said annular gap support means for holding said actuating and said adjusting means;

quantity determining means for determining the amount of flowable material flown to said second compartment; and control means for controlling at least said adjusting means and the width of said annular gap to achieve a desired degree of delivery to said second compartment, said control means comprising programming means for varying the width of said gap at any time during the flow of said flowable material.

13. The apparatus according to claim 12, wherein said programming means are programmed to allow said closure means in a first step to open the annular gap so as to have a maximum width until a predetermined threshold value for said degree of delivery is attained, and then the annular gap is reduced.

14. The apparatus according to claim 12, wherein said programming means are releasably connected to said control means.

* * * * *

UNITED STATES PATENT AND TRADEMARK OFFICE
CERTIFICATE OF CORRECTION

PATENT NO. : 6,672,342 B2
DATED : January 6, 2004
INVENTOR(S) : Arthur Nassbaumer It is certified that error appears in the above-identified patent and that said Letters Patent is hereby corrected as shown below:

Column 1,
Line 46, after "Background of the Invention", please insert the following paragraph:
-- Although the known apparatus is quite suitable for metering the flowable material form the first compartment into the second compartment which is often selectively coupled or docked to the first compartment, the requirements regarding the accuracy of dosing a predetermined quantity become higher and higher. This is clearly in connection with the special type of material thus handled. The known device, although being provided with an adjustment device, was only able to effect dosing relative roughly - as compared with the requirements of today. One reason is that the flowing properties of the bulk material are dependent on the filling level within the first compartment and, thus, vary over time when the material flows out. --

Column 1,
Line 46, please delete "E-A-29 23 444" and insert -- DE-A-29 23 444 --.

Column 2,
Delete lines 1 through 21.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,672,342 B2
DATED : January 6, 2004
INVENTOR(S) : Arthur Nussbaumer It is certified that error appears in the above-identified patent and that said Letters Patent is hereby corrected as shown below:

Column 1,
Line 46, after "Background of the Invention", please insert the following paragraph:
-- Although the known apparatus is quite suitable for metering the flowable material form the first compartment into the second compartment which is often selectively coupled or docked to the first compartment, the requirements regarding the accuracy of dosing a predetermined quantity become higher and higher. This is clearly in connection with the special type of material thus handled. The known device, although being provided with an adjustment device, was only able to effect dosing relative roughly - as compared with the requirements of today. One reason is that the flowing properties of the bulk material are dependent on the filling level within the first compartment and, thus, vary over time when the material flows out. --

Column 1,
Line 46, please delete "E-A-29 23 444" and insert -- DE-A-29 23 444 --.

Column 2,
Delete lines 1 through 21.

This certificate supersedes Certificate of Correction issued August 10, 2004.

Signed and Sealed this

Fifth Day of July, 2005

JON W. DUDAS
*Director of the United States Patent and Trademark Office*